United States Patent
Aoyama

(10) Patent No.: US 9,644,877 B2
(45) Date of Patent: May 9, 2017

(54) AIR-CONDITIONING APPARATUS AND OPERATION CONTROL METHOD THEREFOR

(71) Applicant: Yutaka Aoyama, Tokyo (JP)

(72) Inventor: Yutaka Aoyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 205 days.

(21) Appl. No.: 14/437,514

(22) PCT Filed: Nov. 22, 2012

(86) PCT No.: PCT/JP2012/080350
§ 371 (c)(1),
(2) Date: Apr. 22, 2015

(87) PCT Pub. No.: WO2014/080496
PCT Pub. Date: May 30, 2014

(65) Prior Publication Data
US 2015/0276290 A1     Oct. 1, 2015

(51) Int. Cl.
*F25B 39/04*     (2006.01)
*F25B 49/02*     (2006.01)
(Continued)

(52) U.S. Cl.
CPC ............. *F25B 49/022* (2013.01); *F24F 1/08* (2013.01); *F25B 13/00* (2013.01); *F25B 49/02* (2013.01);
(Continued)

(58) Field of Classification Search
CPC  F25B 41/062; F25B 49/022; F25B 2400/075; F25B 39/04; F25D 29/00
(Continued)

(56) References Cited

U.S. PATENT DOCUMENTS

| | | | |
|---|---|---|---|
| 2010/0108290 A1* | 5/2010 | Maxwell | F24D 3/10 165/62 |
| 2012/0210742 A1* | 8/2012 | Kato | F25B 13/00 62/159 |
| 2012/0318013 A1* | 12/2012 | Hozumi | B60H 1/3213 62/181 |

FOREIGN PATENT DOCUMENTS

| | | |
|---|---|---|
| EP | 2 017 556 A1 | 1/2009 |
| JP | 3096687 B2 | 8/2000 |
| JP | 2007-078242 A | 3/2007 |

OTHER PUBLICATIONS

Office Action mailed Sep. 1, 2015 in the corresponding JP application No. 2014-548393 (with English translation).
(Continued)

*Primary Examiner* — Melvin Jones
(74) *Attorney, Agent, or Firm* — Posz Law Group, PLC

(57) ABSTRACT

Frequency of a compressor is controlled so that an evaporating temperature reaches a target evaporating temperature during cooling operation, and, when refrigerant stagnation in a condenser of an outdoor unit is detected during cooling operation, a stagnation-resolving operation is implemented. The stagnation-resolving operation includes stagnation suppression control in which the target evaporating temperature is reduced within a range in which an evaporator does not freeze so as to increase a refrigerant circulation volume in the condenser, and stagnation-avoidance priority control which is implemented when implementation of the stagnation suppression control is not able to resolve stagnation, and in which an opening degree of an expansion valve is controlled to be opened and the target evaporating temperature is further reduced so as to further increase the refrigerant circulation volume.

14 Claims, 6 Drawing Sheets

(51) Int. Cl.
*F25B 13/00* (2006.01)
*F24F 1/08* (2011.01)
(52) U.S. Cl.
CPC .... *F25B 49/027* (2013.01); *F25B 2313/0233* (2013.01); *F25B 2313/0314* (2013.01); *F25B 2313/0315* (2013.01); *F25B 2400/13* (2013.01); *F25B 2500/12* (2013.01); *F25B 2600/0253* (2013.01); *F25B 2700/1933* (2013.01); *F25B 2700/21174* (2013.01); *Y02B 30/741* (2013.01)
(58) Field of Classification Search
USPC .................. 62/115, 180, 157, 223, 226, 507
See application file for complete search history.

(56) References Cited

OTHER PUBLICATIONS

International Search Report of the International Searching Authority mailed Feb. 26, 2013 for the corresponding international application No. PCT/JP2012/080350 (and English translation).
Extended European Search Report dated Jun. 13, 2016 issued in corresponding EP patent application No. 12888763.5.

\* cited by examiner

AIR-CONDITIONING APPARATUS AND OPERATION CONTROL METHOD THEREFOR

CROSS REFERENCE TO RELATED APPLICATIONS

This application is a U.S. national stage application of PCT/JP2012/080350 filed on Nov. 22, 2012, the content of which is incorporated herein by reference.

TECHNICAL FIELD

The present invention relates to an air-conditioning apparatus and an operation control method therefor.

BACKGROUND

In some cases, in existing multi-type air-conditioning apparatuses, there occurs a problem in that refrigerant may stagnate in a device and refrigerant pipes that are included in an air-conditioning apparatus. As a technique of resolving such refrigerant stagnation, there has been provided a multi-type air-conditioning apparatus including a plurality of outdoor units. In the multi-type air-conditioning apparatus, refrigerant stagnating in an outdoor heat exchanger or the like included in an outdoor unit whose operation has been stopped is led to an outdoor unit which has become deficient in refrigerant during its operation (for example, see Patent Literature 1).

PATENT LITERATURE

Patent Literature 1: Japanese Patent No. 3096687 (Page 3, FIG. 2)

In recent years, because of savings in space, dominating outdoor units have used a scheme of discharging air upwards, which is called top flow. As an outdoor heat exchanger installed in an outdoor unit, an air-cooled plate-fin-tube-type heat exchanger is used, and, since the scheme of discharging air upwards is dominant, typical placement of the outdoor heat exchanger is naturally vertical placement in which fins are vertically disposed. Then, because of savings in space, the outdoor heat exchanger tends to increase in size in its height direction, and a difference in head pressure of liquid refrigerant tends to increase.

Additionally, in a multi-type air-conditioning apparatus including a plurality of indoor units, when the number of indoor units in operation is small, a heat exchanger (condenser) capacity of an outdoor unit becomes relatively excessive more than the total capacity of heat exchangers (evaporators) of the indoor units in operation. Furthermore, the number of paths of the condenser has been determined in accordance with a pressure loss in each path in the case where all the indoor units are operating. For this reason, a small number of indoor units in operation extremely reduces a refrigerant flow rate in each path of the condenser whose capacity has become relatively excessive more than that of the evaporators. Thus, when a phenomenon in which a refrigerant flow rate in each path of the condenser is reduced occurs in a heat exchanger which has increased in size in its height direction and in which a difference in head pressure has increased as described above, a phenomenon in which liquid refrigerant stagnates in a path of the condenser occurs. That is, during cooling operation, a phenomenon in which the liquid refrigerant stagnates in the condenser included in the outdoor unit occurs.

Thus, when refrigerant stagnation occurs in the condenser, the amount of the refrigerant that circulates in a refrigeration cycle is reduced, and a degree of subcooling of the refrigerant at a condenser outlet is therefore reduced. This results in problems, such as a reduction in capacity due to a reduction in enthalpy difference, and occurrence of refrigerant sound from an expansion valve of an indoor unit due to two-phase refrigerant in a liquid pipe.

For this reason, a technique of resolving refrigerant stagnation in a condenser included in an outdoor unit in a cooling operation is required. In Patent Literature 1, although measures against refrigerant stagnation in a condenser included in an outdoor unit which has been stopped have been described, no description has been provided in terms of reducing or resolving refrigerant stagnation in a condenser included in an outdoor unit in operation.

SUMMARY

The present invention has been accomplished in view of such problems, and an object thereof is to provide an air-conditioning apparatus that enables refrigerant stagnation in a condenser included in an outdoor unit in the cooling operation to be reduced or resolved, and an operation control method therefor.

An air-conditioning apparatus according to the present invention includes: a refrigerant circuit in which an outdoor unit including a compressor whose frequency can be varied and an outdoor heat exchanger, and a plurality of indoor units each including an indoor heat exchanger are connected with refrigerant pipes, and which performs at least a cooling operation in which the outdoor heat exchanger functions as a condenser and also the indoor heat exchanger functions as an evaporator; an expansion valve that is provided between the outdoor heat exchanger and the indoor heat exchanger in the refrigerant circuit; and a controller that controls frequency of the compressor so that an evaporating temperature reaches a target evaporating temperature during cooling operation, and that, when refrigerant stagnation in the condenser of the outdoor unit is detected during cooling operation, implements a stagnation-resolving operation. The controller performs, as the stagnation-resolving operation, stagnation suppression control in which the target evaporating temperature is reduced within a range in which the evaporator does not freeze so as to increase a refrigerant circulation volume in the condenser, and, when implementation of the stagnation suppression control is not able to resolve stagnation, stagnation-avoidance priority control in which an opening degree of the expansion valve is controlled to be opened and also the target evaporating temperature is further reduced so as to further increase the refrigerant circulation volume.

The present invention enables refrigerant stagnation in a condenser included in an outdoor unit in the cooling operation to be suppressed or resolved.

DETAILED DESCRIPTION

Figure 1:
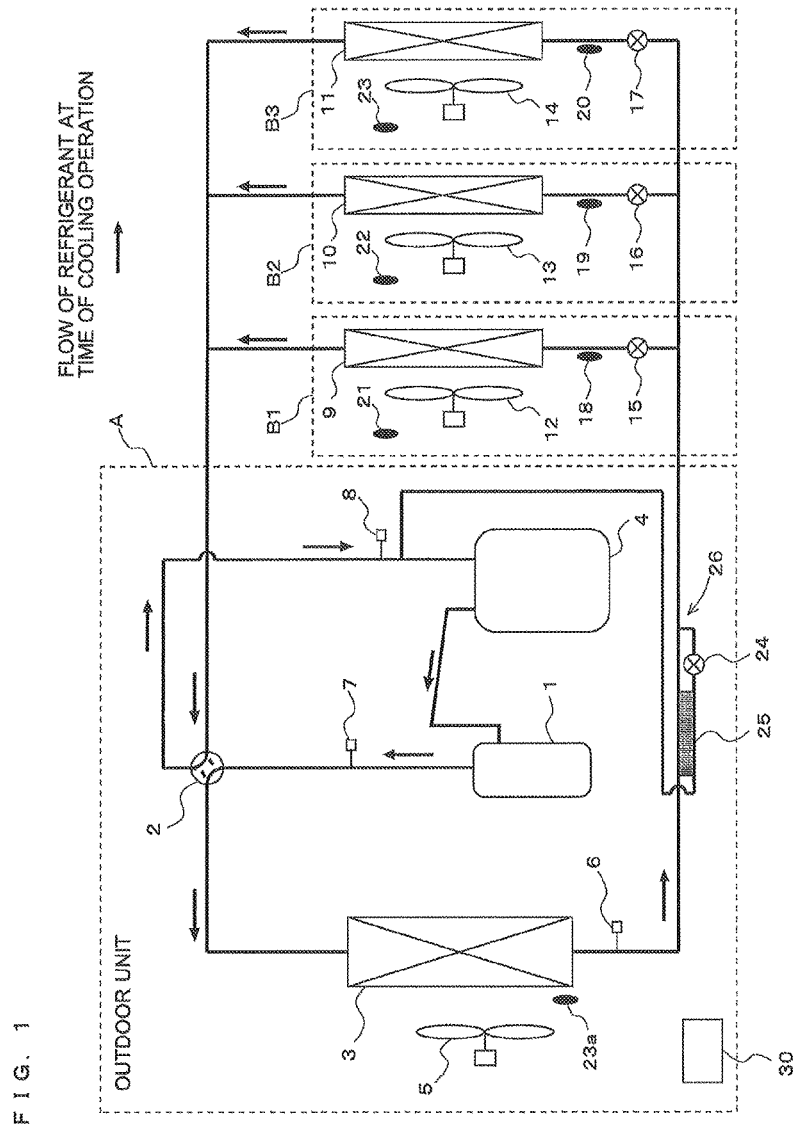
FIG. 1 is a refrigerant circuit diagram of a heat-pump multi-type air-conditioning apparatus in Embodiment of the present invention.

FIG. 1 is a refrigerant circuit diagram of a heat-pump multi-type air-conditioning apparatus in Embodiment of the present invention.

The heat-pump multi-type air-conditioning apparatus (hereinafter simply referred to as an air-conditioning apparatus) includes an outdoor unit A, and a plurality of indoor units B1, B2, and B3 (they may be collectively referred to as indoor units B). The outdoor unit A includes a compressor 1 whose frequency can be varied by an inverter, a switching device 2 that switches between directions in which refrigerant flows, an outdoor heat exchanger 3, an accumulator 4, and an air-sending device 5 that sends air to the outdoor heat exchanger 3. The outdoor unit A further includes a bypass circuit 26 in which a line branches off from between the outdoor heat exchanger 3 and expansion valves 15, 16, and 17, and extends to a suction side of the accumulator 4 through a subcooling expansion valve 24. Although FIG. 1 illustrates an example in which one outdoor unit A is provided, a plurality of outdoor units A may be provided.

The indoor units B1, B2, and B3 have the same structure, and are connected in parallel with the outdoor unit A. Although FIG. 1 illustrates an example in which three indoor units B are provided, it is noted that the number of the indoor units B is not limited to this, and may be two, or four or more.

The indoor units B have indoor heat exchangers 9, 10, and 11, air-sending devices 12, 13, and 14 that respectively send air to the indoor heat exchangers 9, 10, and 11, and the expansion valves 15, 16, and 17 for decompressing and expanding the refrigerant. The expansion valves 15, 16, and 17 are each composed of a motor-operated expansion valve whose opening degree can be adjusted, and the opening degree can be changed by using a pulse signal from a controller 30 to be described.

Then, there is constructed a refrigerant circuit in which the outdoor unit A and the indoor units B are connected with refrigerant pipes, and in which the refrigerant circulates through the compressor 1, the outdoor heat exchanger 3, the expansion valves 15, 16, and 17, the indoor heat exchangers 9, 10, and 11, and the accumulator 4. Additionally, the bypass circuit 26 is connected to the refrigerant circuit, and a degree of subcooling of the refrigerant flowing to an indoor-units B side is further increased by adjusting a flow rate in the subcooling expansion valve 24.

In the air-conditioning apparatus structured in this way, switching of the switching device 2 enables the cooling operation or the heating operation. When the switching device 2 is switched to a solid line side in FIG. 1, the outdoor heat exchanger 3 serves as a condenser, the indoor heat exchangers 9, 10, and 11 serve as evaporators, and the cooling operation is implemented. When the switching device 2 is switched to a dotted line side in FIG. 1, the outdoor heat exchanger 3 serves as an evaporator, the indoor heat exchangers 9, 10, and 11 serve as condensers, and the heating operation is implemented. Arrows in FIG. 1 represent the flow of the refrigerant at the time of the cooling operation.

It is noted that the air-conditioning apparatus can perform at least the cooling operation, and thus the switching device 2 is not an indispensable component, and can be omitted. Furthermore, the structure of the refrigerant circuit is not limited to the illustrated structure, and the bypass circuit 26 and the accumulator 4 can be omitted. As in the expansion valves 15, 16, and 17 of the indoor units B, the subcooling expansion valve 24 of the bypass circuit 26 is composed of a motor-operated expansion valve whose opening degree can be adjusted, and the opening degree can be changed by using a pulse signal from the controller 30 to be described.

Next, sensors provided in the air-conditioning apparatus will be described.

The outdoor unit A includes a pressure sensor 6 that is provided on a liquid side of the outdoor heat exchanger 3 and detects a pressure of the refrigerant, a pressure sensor 7 that is provided on an outlet pipe of the compressor 1 and detects a discharge pressure, and a pressure sensor 8 that is provided on an inlet pipe of the accumulator 4 and detects a suction pressure. Additionally, the outdoor unit A further includes a temperature sensor 23a that measures an outdoor air temperature.

The indoor units B1, B2, and B3 respectively include temperature sensors 18, 19, and 20 that each detect an indoor unit liquid pipe temperature, and temperature sensors 21, 22, and 23 that each detect an intake-air temperature (indoor temperature).

The air-conditioning apparatus further include the controller 30 that controls the entire air-conditioning apparatus. The controller 30 is composed of a microcomputer, and includes, for example, a CPU, a RAM, and a ROM. The ROM stores a control program and a program corresponding to a stagnation-resolving operation to be described.

The controller 30 has determined a target evaporating temperature at the time of the cooling operation and a target condensing temperature at the time of the heating operation so as to be able to exhibit air-conditioning capacity required in the plurality of indoor units B. Then, the controller 30 controls frequency of the compressor 1 so that an evaporating temperature or condensing temperature reaches the target evaporating temperature or target condensing temperature. Furthermore, the controller 30 controls opening degrees of the expansion valves 15, 16, and 17 with respect to rotation speeds of the air-sending devices 5, 12, 13, and 14 that have been determined by the user of each indoor unit B so that a degree of superheat (at the time of the cooling operation) or a degree of subcooling (at the time of the heating operation) reaches a target value.

Additionally, when the controller 30 detects, on the basis of detection values from the sensors, refrigerant stagnation in the outdoor heat exchanger (condenser) 3 during cooling operation, the controller 30 further performs the stagnation-resolving operation for resolving the refrigerant stagnation in the outdoor heat exchanger (condenser) 3 on the basis of the program corresponding to the stagnation-resolving operation. Although FIG. 1 illustrates an example in which the controller 30 is provided in the outdoor unit A, it is noted that there may be provided the structure in which a controller is provided in the outdoor unit A and each indoor unit B, and controllers may perform cooperative processing together with each other.

Embodiment is characterized by the stagnation-resolving operation. Here, principles of refrigerant stagnation occurrence will be described prior to the description of the stagnation-resolving operation. In addition, because the outdoor heat exchanger 3 in which refrigerant stagnation is to be resolved serves as a condenser, hereinafter the outdoor heat exchanger 3 may be referred to as a condenser 3.

Figure 2:
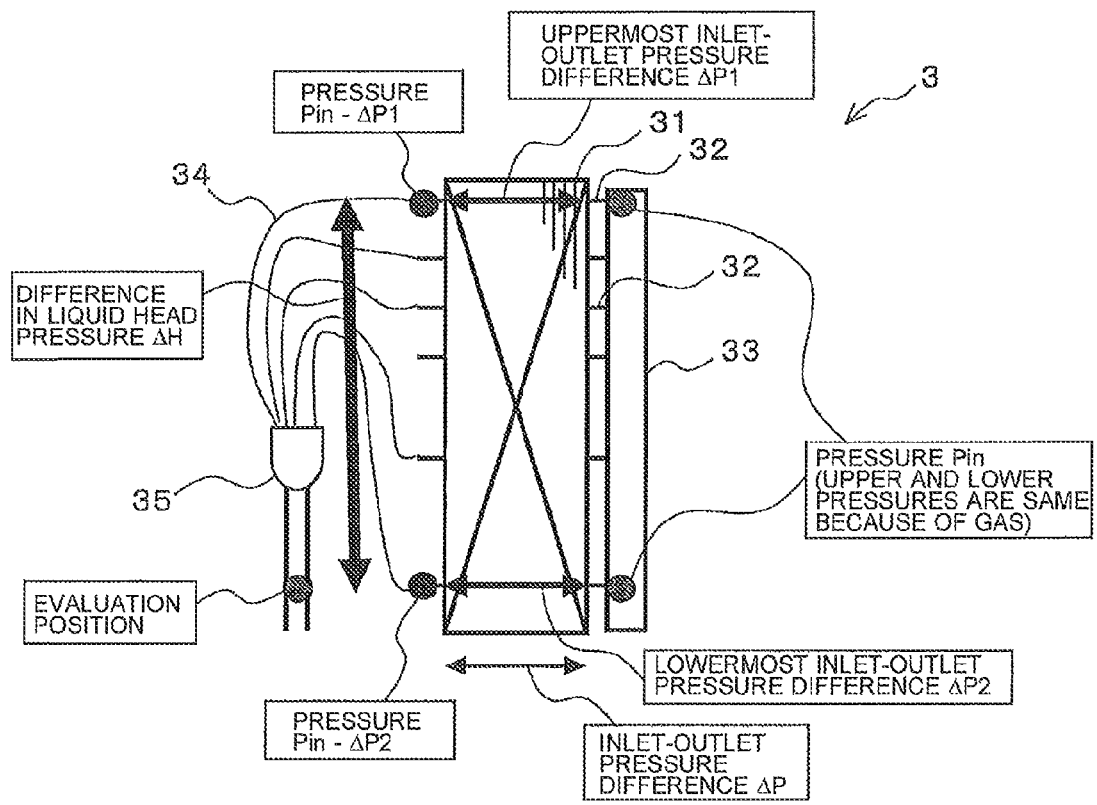
FIG. 2 illustrates the general structure of an outdoor heat exchanger in FIG. 1.

FIG. 2 illustrates the general structure of the outdoor heat exchanger 3 in FIG. 1. The outdoor heat exchanger 3 is composed of an air-cooled fin-tube-type heat exchanger, and there is illustrated here the heat exchanger which is used as an evaporator or condenser when directions in which the refrigerant flows are switched by the switching device 2.

The outdoor heat exchanger 3 has the structure in which a plurality of plate-shaped fins 31 disposed vertically are spaced in parallel to each other, and in which a plurality of heat-transfer tubes 32 extending perpendicular to and through the plurality of plate-shaped fins 31 are provided. Additionally, a header 33 is provided at one ends of the plurality of heat-transfer tubes 32, and each end of the plurality of heat-transfer tubes 32 communicates with the header 33. In addition, one ends of capillary tubes 34 are connected to the respective other ends of the plurality of heat-transfer tubes 32. Furthermore, a distributor 35 that distributes the refrigerant when the outdoor heat exchanger 3 is used as an evaporator is connected to the other ends of the capillary tubes 34.

When the outdoor heat exchanger 3 is used as a condenser, the refrigerant flows in from a header 33 side, is distributed to each heat-transfer tube (hereinafter may be referred to as each path), and flows through each heat-transfer tube 32 from one end side (path inlet side) to the other end side (path outlet side). Subsequently, the refrigerant passes through the capillary tubes 34, then meets at the distributor 35, and becomes a flow toward the indoor units B.

As illustrated in FIG. 2, in order to distribute the refrigerant over the entire heat exchanger so that heat exchange can be performed efficiently, the air-cooled plate-type heat exchanger has the structure in which the refrigerant is caused to flow into the plurality of heat-transfer tubes 32. Here, when required cooling capacity is reduced due to, for example, a reduction in the number of the indoor units B in operation, and frequency of the compressor 1 is reduced, that is, when the compressor 1 goes into a low capacity operation, the amount of the refrigerant discharged from the compressor 1 is reduced. Then, a circulation volume that flows into each path of the condenser 3 is reduced, and thus an inlet-outlet pressure difference ΔP of the entire heat exchanger is significantly reduced. Additionally, in the case where the condenser 3 is vertically placed, in the condenser 3, a head pressure is applied to an outlet of a lower path with respect to an upper path due to a difference in height.

When the compressor 1 goes into the low capacity operation and an inlet-outlet pressure difference (pressure loss) at the lower path is reduced, this inlet-outlet pressure difference yields to the head pressure applied to the outlet of the lower path, the refrigerant does not flow to the path outlet side, and a phenomenon in which the refrigerant stagnates, as liquid refrigerant, in the heat-transfer tubes 32 (it is called that the refrigerant dwells) occurs. A description in this regard will be provided below.

In FIG. 2, suppose that a condenser inlet pressure is Pin, an uppermost inlet-outlet pressure difference (pressure loss) is ΔP1, a lowermost inlet-outlet pressure difference (pressure loss) is ΔP2, and a difference in head pressure between an uppermost path and a lowermost path is ΔH. In this case, among pressures at condenser outlets (junctions with the capillary tubes 34), a pressure at an uppermost outlet is Pin−ΔP1, and a pressure at a lowermost outlet is Pin −ΔP2.

Next, when consideration is given by using a lowermost position as the reference, the difference in head pressure ΔH is applied to the uppermost path, and an outlet pressure of the uppermost path is therefore Pin−ΔP1+ΔH. Additionally, a head pressure of the lowermost path is 0, and an outlet pressure of the lowermost path is therefore Pin−ΔP2. At an evaluation position, the pressures are the same because the refrigerant of each path meets, and thus $$Pin-\Delta P1+\Delta H=Pin-\Delta P2$$

holds.

A transformation of this equation is $$\Delta P2=\Delta P1-\Delta H.$$

Here, when a low flow rate in the condenser 3 results in a relationship of ΔP1=ΔH, a relationship of ΔP2=0 is obtained. ΔP2 being 0 means that, in the lowermost path, the inlet-outlet pressure difference ΔP2 is not obtained and the refrigerant does not therefore flow. For this reason, the refrigerant stagnates in the condenser 3.

Hence, to resolve refrigerant stagnation, the inlet-outlet pressure difference ΔP has to be ensured, and, to do this, a refrigerant circulation volume in the refrigerant circuit is increased.

Figure 3:
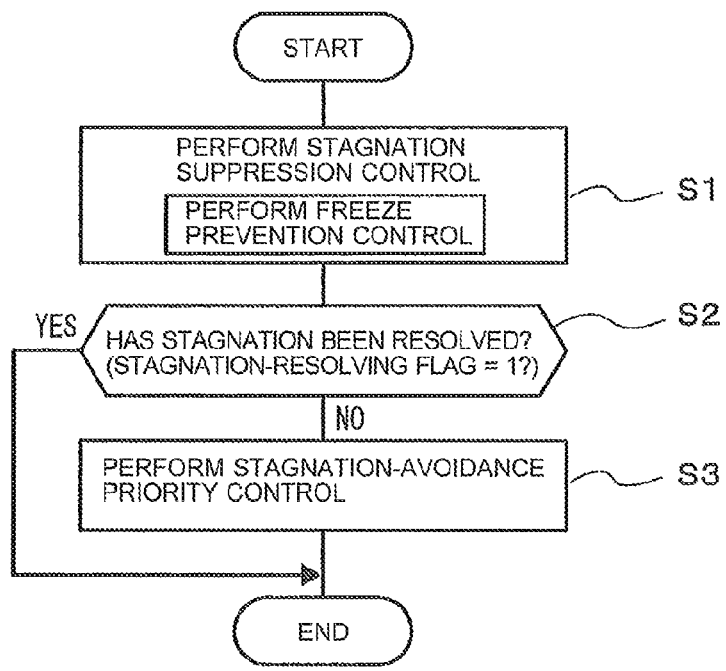
FIG. 3 is a flowchart illustrating a flow of a stagnation-resolving operation performed in the air-conditioning apparatus according to Embodiment of the present invention.

FIG. 3 is a flowchart illustrating a flow of the stagnation-resolving operation performed in the air-conditioning apparatus according to Embodiment of the present invention. First, a general description of the stagnation-resolving operation will be provided below with reference to FIG. 3.

While the air-conditioning apparatus is in the cooling operation, the controller 30 is checking, on the basis of detection values from the sensors, whether or not refrigerant stagnation has occurred in the condenser 3. A stagnation detection method is not limited to a particular method, and any method can be adopted. A specific method of the stagnation detection method will be described later. Then, when the controller 30 detects that refrigerant stagnation has occurred, the controller 30 starts the stagnation-resolving operation for solving refrigerant stagnation.

As described above, to resolve the refrigerant stagnation, the inlet-outlet pressure difference ΔP of the outdoor heat exchanger 3 has to be increased, and a refrigerant circulation volume therefore has to be increased. To do this, first, stagnation suppression control is performed (S1). The stagnation suppression control will be described in detail later. An object of the stagnation suppression control is to increase the refrigerant circulation volume in the refrigerant circuit to more than or equal to a refrigerant circulation volume at which the refrigerant does not stagnate in the outdoor heat exchanger 3 (hereinafter referred to as a stagnation circulation volume reference value), and control in which the target evaporating temperature is reduced lower than at present is performed. This may cause the indoor heat exchangers 9, 10, and 11 of the indoor units B to freeze. Thus, in the stagnation suppression control, while freeze prevention control is being performed so that the indoor heat exchangers 9, 10, and 11 of the indoor units B do not freeze, the operation for resolving refrigerant stagnation is performed. That is, in a sense, the operation is an operation on which a limitation has been imposed so that the indoor heat exchangers 9, 10, and 11 of the indoor units B do not freeze.

For this reason, in some cases, even when the stagnation suppression control is performed, the refrigerant stagnation is not able to be resolved. Hence, after the stagnation suppression control has been ended, the controller 30 checks whether or not the refrigerant stagnation has been able to be resolved (S2), and, when the refrigerant stagnation has not been able to be resolved, the controller 30 lifts the limitation based on the freeze prevention control, and performs stagnation-avoidance priority control in which avoidance of the refrigerant stagnation is prioritized (S3). In addition, an object of the stagnation-avoidance priority control is also to increase the refrigerant circulation volume in the refrigerant circuit to more than or equal to the stagnation circulation volume reference value, and the object is the same as that of the stagnation suppression control. When the stagnation suppression control has been able to resolve the refrigerant stagnation, the controller 30 ends the stagnation-resolving operation without performing the stagnation-avoidance priority control, and the cooling operation goes back to normal.

The stagnation detection method and each control in the stagnation-resolving operation will be described in detail in turn below.

[Stagnation Detection Method]

As the stagnation detection method, there are two methods (a) to (b) as follows. Refrigerant stagnation is detected by using one or the other of these methods.

(a) When a state in which "pressure sensor 7 detection value−pressure sensor 6 detection value≤ΔH+α" is satisfied lasts for, for example, about 15 minutes in a row, it is determined that refrigerant stagnation has occurred. Here, ΔH is a difference in head pressure between the uppermost path and the lowermost path of the condenser 3. A numerical value of α is determined in consideration of, for example, a pressure loss from the pressure sensor 7 to an inlet of the outdoor heat exchanger 3, and errors in the pressure sensors.

(b) When a state in which "refrigerant circulation volume per path of condenser 3≤stagnation circulation volume reference value" is satisfied lasts for, for example, about 15 minutes in a row, it is determined that refrigerant stagnation has occurred. The refrigerant circulation volume per path may be an actual measured value, or may be detected from a calculated value. In the case where detection is performed from a calculated value, an entire refrigerant circulation volume is determined from a refrigerant flowmeter or a compressor inherent flow characteristic, and a flow rate per path is determined. To calculate the compressor inherent flow characteristic, there are required the pressure sensor 7, the pressure sensor 8, a suction temperature of the compressor 1, and compressor frequency, and detection means for them are therefore required.

The circulation volume reference value of refrigerant stagnation is a refrigerant circulation volume at which refrigerant stagnation begins to occur, and is less than or equal to about 50 to 100 kg/m²·s per path as a guideline. However, in accordance with conditions of path distribution, a difference in head pressure, and operating pressure, this numerical value differs between a calculated value and an actual flow rate at which the refrigerant stagnation begins, and has to be determined empirically.

A stagnation circulation volume reference value Grs [kg/min] can be calculated as follows. When the uppermost inlet-outlet pressure difference ΔP1 of the outdoor heat exchanger 3 becomes equal to the difference in head pressure ΔH, refrigerant stagnation occurs, and thus the following equation (1) holds.

$$\Delta H = L \times \alpha \times Grs \div 60 \div N \quad (1),$$

where
L: the length of an uppermost heat-transfer tube [m],
N: the number of paths of the condenser 3,
α: a pressure loss characteristic determined based on a heat-transfer tube characteristic [Pa/(kg/s)/m], and
ΔH: a difference in head pressure [Pa].

The above equation (1) is transformed to the following equation (2), and the stagnation circulation volume reference value Grs can be determined using the equation (2).

$$Grs = \Delta H \div L \div \alpha \times 60 \times N \quad (2)$$

[Stagnation Suppression Control]

Figure 4:
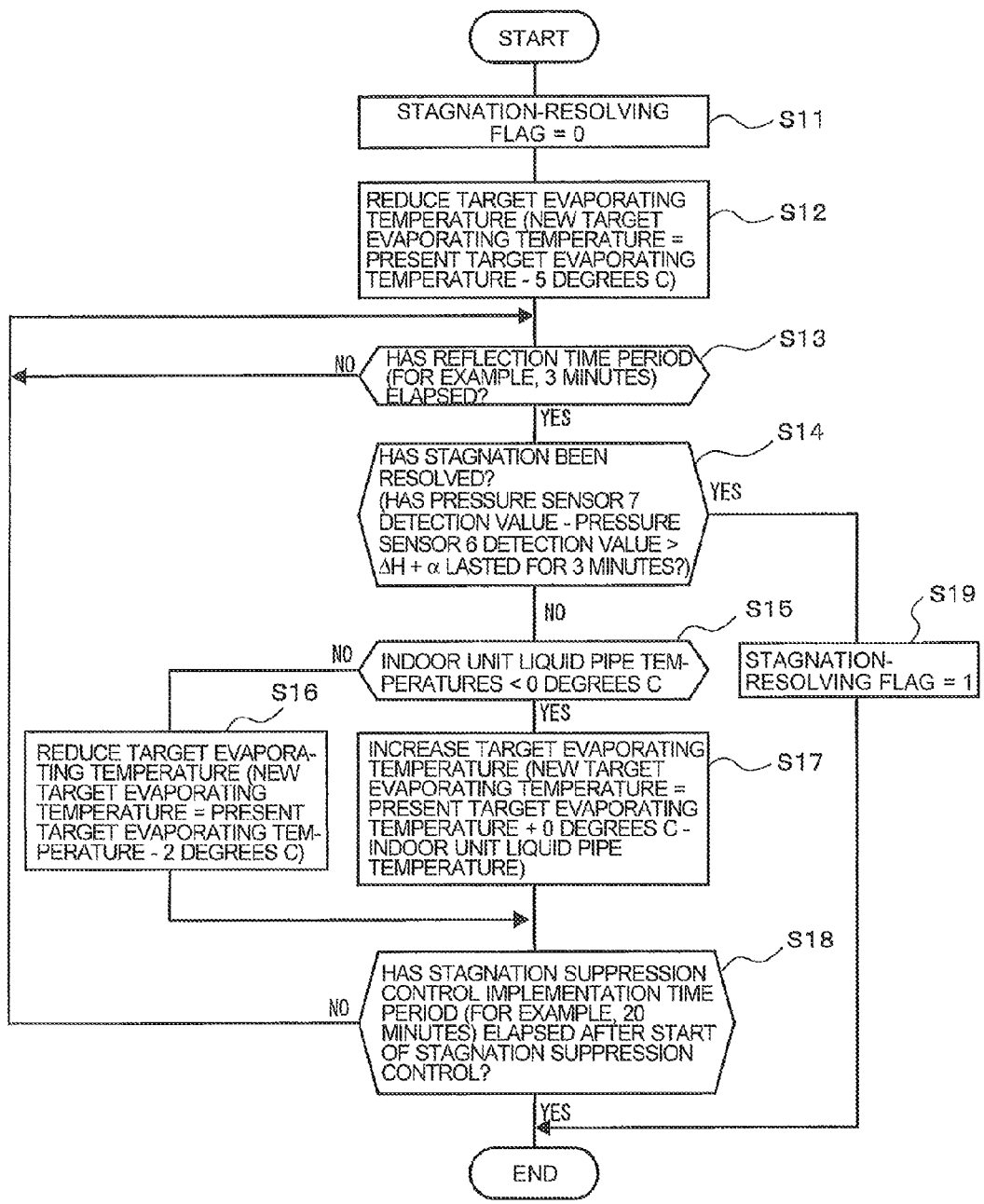
FIG. 4 is a flowchart illustrating a flow of stagnation suppression control in FIG. 3.

FIG. 4 is a flowchart illustrating a flow of the stagnation suppression control in FIG. 3.

First, the controller 30 sets a stagnation-resolving flag to be updated to "1" when the refrigerant stagnation is resolved by the stagnation suppression control to "0" (S11). Although a flag is provided here so as to make a flow of the stagnation-resolving operation easily understandable, it is noted that a flag does not necessarily have to be provided. The point is to implement a flow in which, when the refrigerant stagnation has not been resolved by the stagnation suppression control, the stagnation-avoidance priority control is performed, and a flow in which, when the refrigerant stagnation has been resolved at the end of the stagnation suppression control, the stagnation-avoidance priority control is not performed and the stagnation-resolving operation is ended. In addition, the same applies in modifications to be described.

Then, the controller 30 reduces the target evaporating temperature by a predetermined temperature (for example, 5 degrees C.) with respect to the target evaporating temperature determined before the stagnation suppression control is started (S12). As a result of the reduction in the target evaporating temperature, the controller 30 increases frequency of the compressor 1 higher than at present so that an evaporating temperature approaches the target evaporating temperature. Such an increase in the frequency of the compressor 1 increases the refrigerant circulation volume, and thus an operation of resolving the refrigerant stagnation is performed.

After the target evaporating temperature is changed, the controller 30 waits until such a time period that the refrigerant circulation volume in the refrigerant circuit is changed and a new target evaporating temperature is reflected in indoor unit liquid pipe temperatures (hereinafter referred to as a reflection time period, for example, 3 minutes) has elapsed (S13). Subsequently, the controller 30 checks whether or not the refrigerant stagnation has been resolved (S14). In a determination as to whether or not the refrigerant stagnation has been resolved, when a state in which a relationship of pressure sensor 7 detection value−pressure sensor 6 detection value>ΔH+a is satisfied lasts for, for example, 3 minutes, it is determined that the refrigerant stagnation has been resolved.

In a specific process in S14, it is checked whether or not the relationship of pressure sensor 7 detection value−pressure sensor 6 detection value>ΔH+α has been satisfied, and a stagnation-resolving timer is started when the relationship has been satisfied. Then, when a processing loop returns to S14 again, if the stagnation-resolving timer has been started and if a measurement time period measured by the stagnation-resolving timer represents, for example, an elapsed time period of 3 minutes, it is determined that the refrigerant stagnation has been resolved, the stagnation-resolving flag=1 is set (S19), and the stagnation suppression control is ended. On the other hand, if the stagnation-resolving timer has not been started, or, if, for example, 3 minutes have not elapsed even if the stagnation-resolving timer has been started, it is determined that the refrigerant stagnation has not been resolved.

Subsequently, in a determination in S14, when it is determined that the refrigerant stagnation has not been resolved, the target evaporating temperature is further reduced so as to resolve the refrigerant stagnation. That is, in the stagnation suppression control, control in which the target evaporating temperature is reduced by a predetermined temperature (for example, 2 degrees C.) every reflection time period (for example, 3 minutes here) is repeatedly performed until a predetermined stagnation suppression control implementation time period (for example, 20 minutes) has elapsed after the start of the stagnation suppression control (S14 to S18).

However, as described above, an excessive reduction in the target evaporating temperature may cause the indoor heat exchangers 9, 10, and 11 of the indoor units B to freeze. Thus, in the stagnation suppression control, if the indoor heat exchangers 9, 10, and 11 of the indoor units B are likely to freeze, the freeze prevention control is performed so that they do not freeze.

That is, after the reflection time period has elapsed since the target evaporating temperature was set to a new target evaporating temperature in S12, when the refrigerant stagnation has not been resolved (S12→S13→NO in S14), the controller 30 checks whether or not indoor unit liquid pipe temperatures detected by the temperature sensors 18, 19, and 20 are lower than 0 degrees C. (S15). Then, when the indoor unit liquid pipe temperatures detected by the temperature sensors 18, 19, and 20 are 0 degrees C. or higher, the controller 30 determines that freezing does not occur, and further reduces the target evaporating temperature by 2 degrees C. (S16).

On the other hand, when the indoor unit liquid pipe temperatures detected by the temperature sensors 18, 19, and 20 are lower than 0 degrees C., that is, when the controller 30 determines that freezing is likely to occur, the controller 30 updates the new target evaporating temperature to "present target evaporating temperature+0−present indoor unit liquid pipe temperature" (S17). This is intended, when an indoor unit liquid pipe temperature falls below 0 degrees C. due to a reduction in the target evaporating temperature due to the start of the stagnation suppression control (that is, when a present indoor unit liquid pipe temperature is a negative value), to increase the target evaporating temperature by an amount by which the indoor unit liquid pipe temperature falls below 0 degrees C. Such an increase in the target evaporating temperature by an amount by which the present indoor unit liquid pipe temperature falls below 0 degrees C. increases the indoor unit liquid pipe temperature to 0 degrees C. or higher, thereby preventing the indoor unit liquid pipe from freezing.

Here, changes in evaporating temperature and changes in indoor unit liquid pipe temperature in the freeze prevention control will be described by taking specific numerical values as an example.

Figure 5:
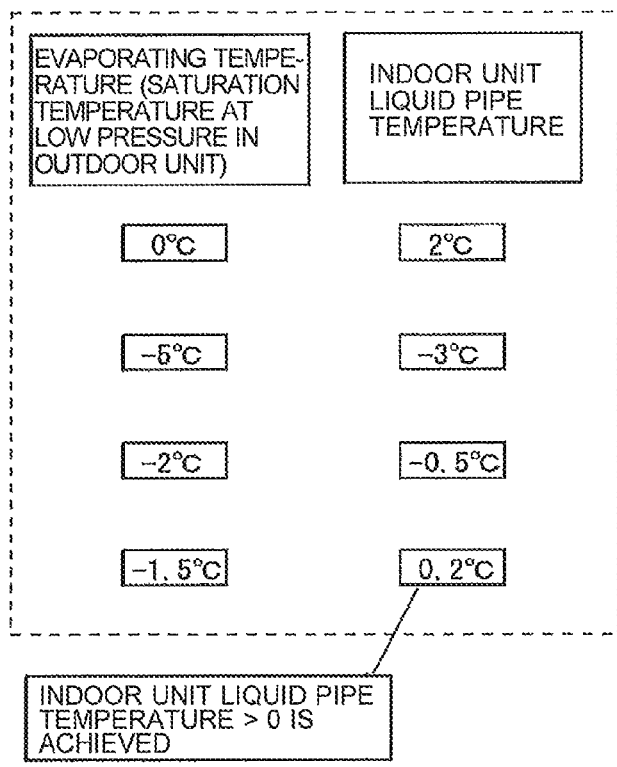
FIG. 5 illustrates an example of changes in evaporating temperature (saturation temperature at low pressure in an outdoor unit) and changes in indoor unit liquid pipe temperature in freeze prevention control in FIG. 3.

FIG. 5 illustrates an example of changes in evaporating temperature (saturation temperature at low pressure in the outdoor unit) and changes in indoor unit liquid pipe temperature in the freeze prevention control in FIG. 3.

Suppose that, at the start of the stagnation-resolving operation, an evaporating temperature is 0 degrees C. and an indoor unit liquid pipe temperature is 2 degrees C. Then, the stagnation-resolving operation is started after the refrigerant stagnation has been detected, and the target evaporating temperature is reduced by 5 degrees C. to be set to −5 degrees in S12 of the stagnation suppression control. This reduces the indoor unit liquid pipe temperature to −3 degrees C. after the reflection time period.

As a result of the reduction in the indoor unit liquid pipe temperature to −3 degrees C., a determination of YES is made in S17, and the target evaporating temperature is set to −5 degrees C.−(−3 degrees C.)=−2 degrees C. in S15. Such an increase in the target evaporating temperature increases the indoor unit liquid pipe temperature to −0.5 degrees C. after the reflection time period.

Subsequently, a determination of YES is made in S15 again, and the target evaporating temperature is set to −2 degrees C.−(−0.5 degrees C.)=−1.5 degrees C. Such another increase in the target evaporating temperature increases the indoor unit liquid pipe temperature to 0.2 degrees C. That is, a relationship of indoor unit liquid pipe temperature>0 is achieved.

The above processes of S13 to S18 are repeatedly performed until the stagnation suppression control implementation time period (for example, 20 minutes) has elapsed. While the processes of S13 to S18 are repeatedly performed, if the refrigerant stagnation is resolved, a determination of YES is made in S14, the stagnation-resolving flag=1 is set, and the stagnation suppression control is ended. On the other hand, even if the refrigerant stagnation has not been able to be resolved, when the stagnation suppression control implementation time period has elapsed (S18), the stagnation suppression control is ended. After the end of the stagnation suppression control, the flow proceeds to S2 illustrated in FIG. 3. Thus, the stagnation-resolving flag=1 is set when the refrigerant stagnation has been able to be resolved, and the stagnation-resolving flag=0 is set when the stagnation suppression control implementation time period has elapsed without the refrigerant stagnation having been able to be resolved. Hence, in accordance with the stagnation-resolving flag of "0" or "1", it can be decided whether or not to perform the subsequent stagnation-avoidance priority control.

[Stagnation-Avoidance Priority Control]

Figure 6:
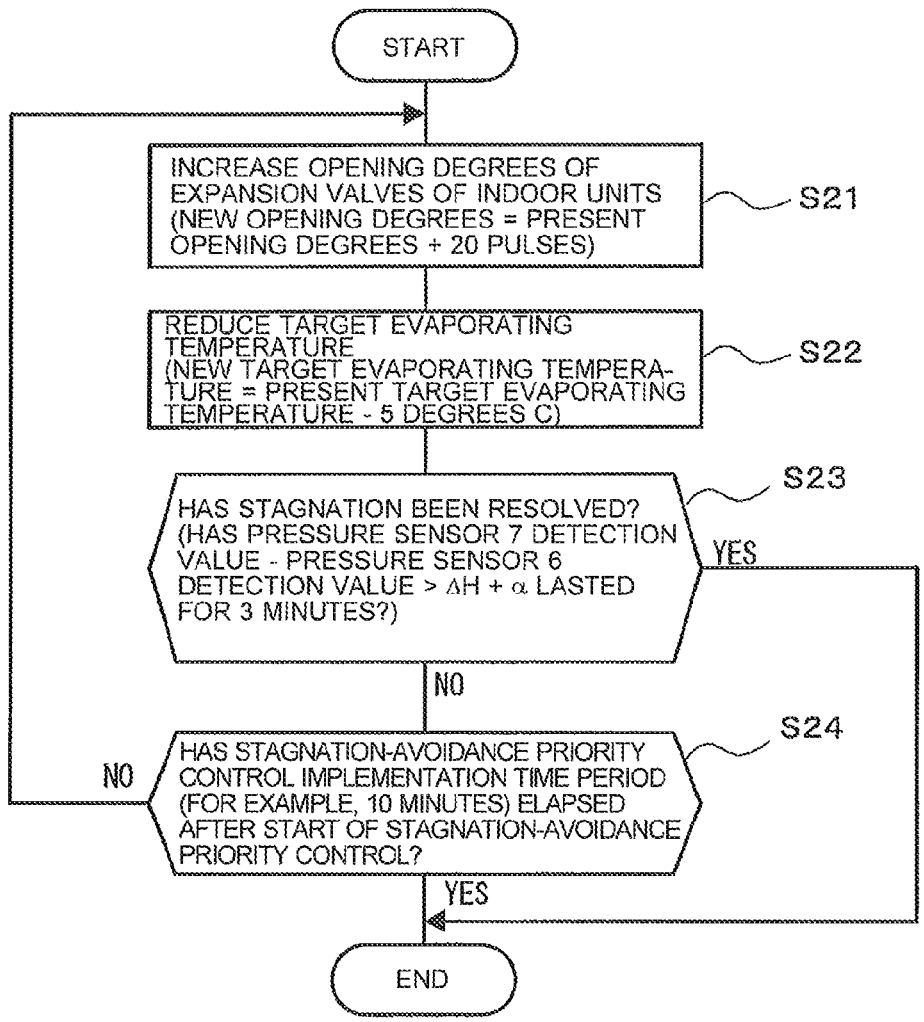
FIG. 6 is a flowchart illustrating a flow of stagnation-avoidance priority control in FIG. 3.

FIG. 6 is a flowchart illustrating a flow of the stagnation-avoidance priority control in FIG. 3.

The stagnation-avoidance priority control is the same as the stagnation suppression control in that frequency of the compressor 1 is increased by reducing the target evaporating temperature. In the stagnation-avoidance priority control, regardless of whether or not indoor unit liquid pipe temperatures are lower than 0 degrees C., opening degrees of the expansion valves 15, 16, and 17 are controlled to be opened (for example, a 20-pulse increase) (S21), and also the target evaporating temperature is further reduced lower than at present by, for example, 5 degrees C. (S22).

Such increases in the opening degrees of the expansion valves 15, 16, and 17 of the indoor units B increase low pressure, and also such a reduction in the target evaporating temperature further increases frequency of the compressor 1, thereby further increasing the refrigerant circulation volume. As a result, the operation of resolving the refrigerant stagnation is performed.

Subsequently, the controller 30 determines whether or not the refrigerant stagnation has been resolved (S23) as in S14 in FIG. 4, and, when the controller 30 determines that the refrigerant stagnation has been resolved, the controller 30 ends the stagnation-avoidance priority control. On the other hand, when the controller 30 determines that the refrigerant stagnation has not been resolved in S23, the controller 30 repeatedly performs processes of S21 to S23 until a predetermined stagnation-avoidance priority control implementation time period (for example, 10 minutes) has elapsed (S24). That is, in the stagnation-avoidance priority control, a combination of an operation of controlling the opening degrees of the expansion valves 15, 16, and 17 to be opened and an operation of reducing the target evaporating temperature is repeatedly performed for the stagnation-avoidance priority control implementation time period (for example, 10 minutes).

The stagnation-avoidance priority control implementation time period is set to a time period shorter than the stagnation suppression control implementation time period, and control in which resolving of the refrigerant stagnation is prioritized although a risk of freezing is being taken for only a short time period is performed. If the refrigerant stagnation has not been resolved within the stagnation-avoidance priority control implementation time period, it is determined that the time has run out, and the stagnation-avoidance priority control is ended without the refrigerant stagnation having been resolved. Even in this case, it is noted that the amount of the refrigerant stagnation can be reduced lower than that at the start of the stagnation-resolving operation if not resolving of the refrigerant stagnation. Furthermore, to end the stagnation-avoidance priority control on the basis of the time period in this way is effective as a measure against an error in which, for example, it is determined that the refrigerant stagnation has not been resolved because of, for example, a sensor abnormality although the refrigerant stagnation has actually been resolved.

[Stagnation-Resolving Operation Implementation Interval]

Figure 7:
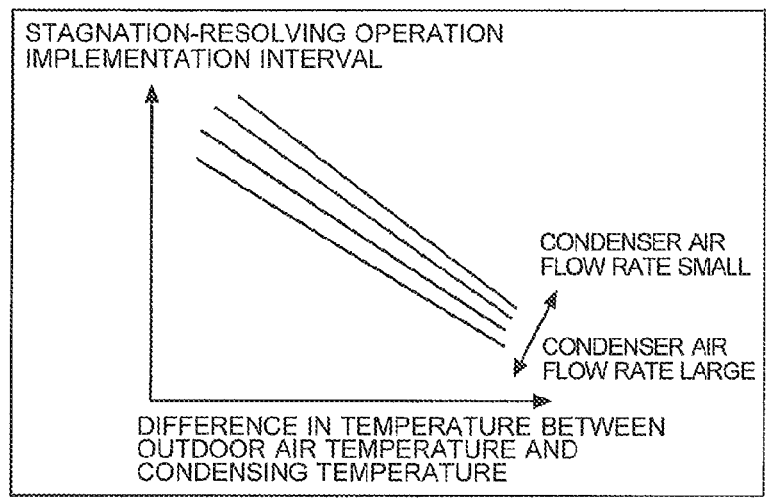
FIG. 7 illustrates, for each condenser air flow rate, a relationship between a difference in temperature between an outdoor air temperature and a condensing temperature, and a stagnation-resolving operation implementation control interval.

FIG. 7 illustrates, for each condenser air flow rate, a relationship between a difference in temperature between an outdoor air temperature and a condensing temperature, and a stagnation-resolving operation implementation control interval.

The stagnation-resolving operation does not have to be performed before subsequent stagnation occurs after once the stagnation-resolving operation was performed and the refrigerant stagnation was resolved. A stagnation speed of refrigerant is determined by using a difference in temperature between an outdoor air temperature and a condensing temperature, and a condenser air flow rate (which is determined based on a rotation speed of the air-sending device 5). FIG. 7 illustrates that the larger the condenser air flow rate is, the shorter a stagnation-resolving operation implementation interval is.

Hence, a time interval from the end of this stagnation-resolving operation to the start of a subsequent stagnation-resolving operation (hereinafter referred to as a stagnation-resolving operation implementation interval) may be defined on the basis of a difference in temperature between an outdoor air temperature and a condensing temperature, and a condenser air flow rate (which is determined based on a rotation speed of the air-sending device 5). The stagnation-resolving operation implementation interval is determined at the end of this stagnation-resolving control. Thus, in comparison with the case where the stagnation-resolving operation implementation interval is set to a fixed interval so as to be the same interval every time, in the case where the stagnation-resolving operation implementation interval is determined on the basis of temperature information and so forth at the end of stagnation-resolving control, the stagnation-resolving operation can be implemented at a pace corresponding to an actual environment.

Additionally, in the above description, although the stagnation-resolving operation is started when refrigerant stagnation is detected on the basis of, for example, sensor detection values during cooling operation, the stagnation-resolving operation may be started on the basis of a stagnation-resolving operation implementation interval as described here. Furthermore, a first round of the stagnation-resolving operation may be started when refrigerant stagnation is detected on the basis of, for example, sensor detection values during cooling operation, and second and later rounds of the stagnation-resolving operation may be started on the basis of a stagnation-resolving operation implementation interval calculated on the basis of a difference in temperature between an outdoor air temperature and a condensing temperature, and a condenser air flow rate (which is determined based on a rotation speed of the air-sending device 5).

[Stagnation-Resolving Control Performed while Compressor has been Stopped]

When the stagnation suppression control or the stagnation-avoidance priority control is performed, the target evaporating temperature is reduced lower than that at the time of a normal cooling operation. This increases a difference in temperature between a refrigerant temperature (evaporating temperature) and an intake-air temperature detected by the temperature sensors 21, 22 and 23 in the indoor units B, and cooling capacity becomes excessive. Thus, during stagnation-resolving operation, in many cases, it is likely that an intake-air temperature falls below a set temperature, the expansion valves 15, 16, and 17 of the indoor units B are closed, and all the indoor units B are put into a thermostat-off state (air-blowing state). When all the indoor units B are put into a thermostat-off state in this way, the controller 30 stops the compressor 1.

While the compressor 1 has been stopped, high and low pressures of the refrigerant are equilibrated, and a saturation temperature of the condenser 3 therefore falls below an outdoor air temperature detected by the temperature sensor 23. For this reason, the outdoor heat exchanger 3 of the outdoor unit A can be caused to operate as an evaporator. In this case, the air-sending device 5 of the outdoor unit A is forced to operate for a certain time period. This promotes evaporation of the refrigerant stagnating in the outdoor heat exchanger 3 of the outdoor unit A, thereby enabling the refrigerant stagnation to be reduced or resolved.

As described above, in Embodiment, when refrigerant stagnation occurs in the condenser of the outdoor unit A during cooling operation, stagnation suppression control is first performed in which a target evaporating temperature is reduced within a range in which the evaporators do not freeze so that a refrigerant circulation volume in the condenser 3 is increased. Then, when the refrigerant stagnation is not able to be resolved by the stagnation suppression control, stagnation-avoidance priority control is performed in which opening degrees of the expansion valves 15, 16, and 17 are controlled to be opened and the target evaporating temperature is further reduced so that the refrigerant circulation volume is further increased. This enables refrigerant stagnation in the condenser at the time of low capacity operation to be suppressed or resolved while the cooling operation continues. As a result, the amount of refrigerant required in the refrigerant circuit can be ensured, thereby enables capacity to be ensured and a reduction in refrigerant sound from an indoor unit.

It is noted that the stagnation suppression control and the stagnation-avoidance priority control in the stagnation-resolving operation according to the present invention are not limited to control illustrated in FIG. 4 and FIG. 6, and various modifications can be made within the scope of the gist of the present invention, for example, as follows.

Furthermore, the stagnation-resolving operation may be a combination of the respective modifications of the stagnation suppression control and the stagnation-avoidance priority control.

[Modification of Stagnation Suppression Control]

Figure 8:
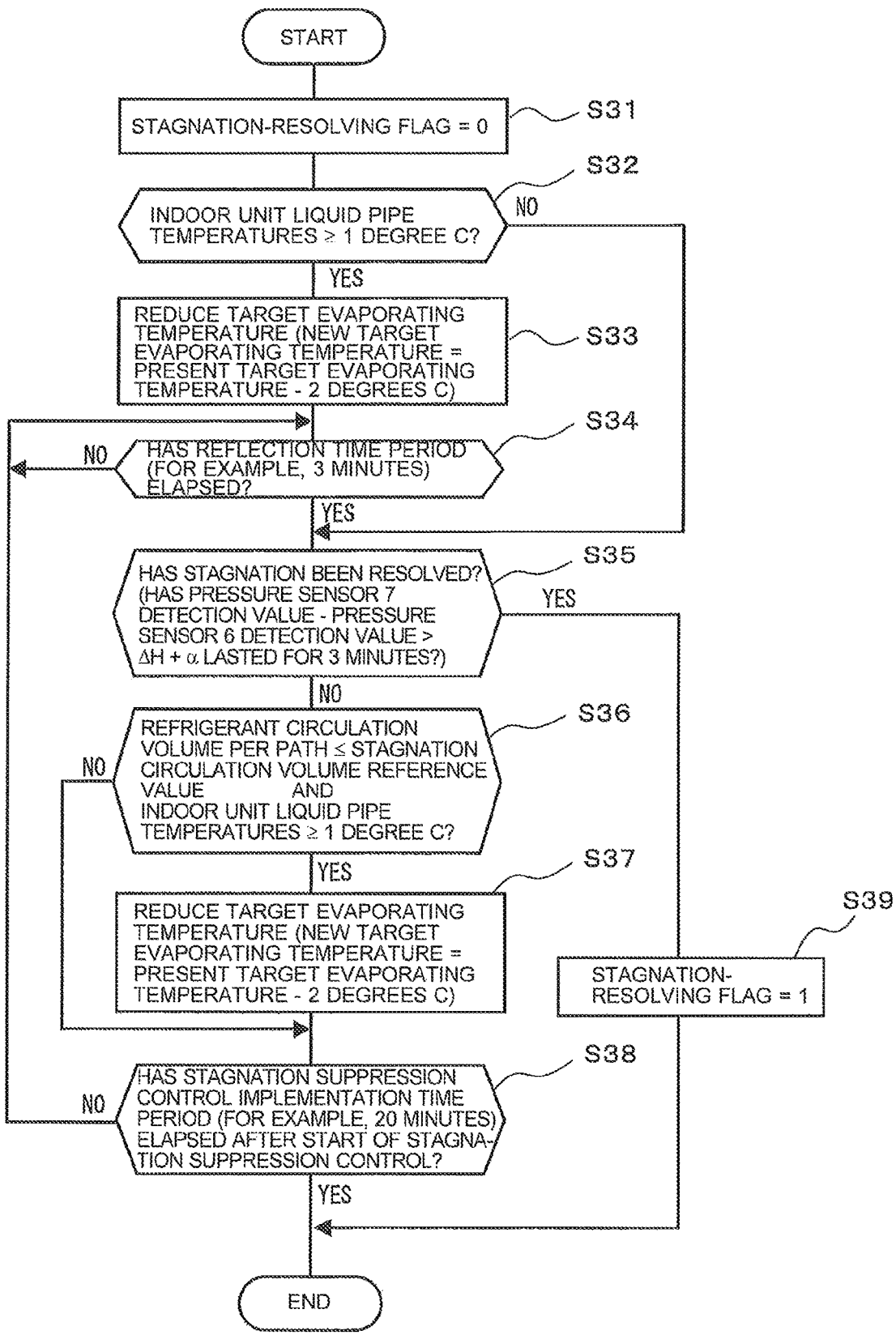
FIG. 8 is a flowchart illustrating a modification of stagnation suppression control in FIG. 4.

FIG. 8 is a flowchart illustrating a modification of the stagnation suppression control in FIG. 4.

In the stagnation suppression control illustrated in FIG. 4, when refrigerant stagnation is detected, regardless of indoor unit liquid pipe temperatures at this point in time, the target evaporating temperature is first reduced by 5 degrees C. On the other hand, in stagnation suppression control in this modification, when refrigerant stagnation is detected, after the stagnation-resolving flag is set to 0 (S31), it is first checked whether or not indoor unit liquid pipe temperatures detected by the temperature sensors 18, 19, and 20 are a predetermined temperature immediately before freezing (for example, 1 degree C.) or higher (S32).

Then, when the indoor unit liquid pipe temperatures are 1 degree C. or higher, the target evaporating temperature is reduced by, for example, 2 degrees C., which is smaller than that in the above stagnation suppression control (S33). Subsequently, after the reflection time period has elapsed (S34), the controller 30 checks whether or not the refrigerant stagnation has been resolved (S35). A determination as to whether or not the refrigerant stagnation has been resolved is the same as that in S14 in FIG. 4. Then, when the refrigerant stagnation has not been resolved, it is checked whether or not a refrigerant circulation volume per path of the condenser 3 is less than or equal to the stagnation circulation volume reference value (which corresponds to a flow rate at which refrigerant stagnation does not occur) and whether or not the indoor unit liquid pipe temperatures are 1 degree C. or higher (S36). When a determination of YES is made in S36, the controller 30 reduces the target evaporating temperature lower than at present by 2 degrees C. (S37). On the other hand, when a determination of NO is made in S36, that is, when the indoor unit liquid pipe temperatures are lower than 1 degree C., the controller 30 leaves the target evaporating temperature unchanged without reducing it because a further reduction in the target evaporating temperature reduces the indoor unit liquid pipe temperatures lower than 0 degrees C. and may result in freezing.

The above processes of S33 to S38 are repeatedly performed until the stagnation suppression control implementation time period (for example, 20 minutes) has elapsed, and, when the stagnation suppression control implementation time period has elapsed without the refrigerant stagnation having been able to be resolved (S38), the stagnation suppression control is ended. Then, the flow proceeds to S2 illustrated in FIG. 3. When the stagnation suppression control implementation time period has elapsed without the refrigerant stagnation having been able to be resolved, the stagnation-resolving flag=0 remains unchanged. Hence, in accordance with the stagnation-resolving flag of 0 or 1, it can be decided whether or not to perform the subsequent stagnation-avoidance priority control.

In the case of such stagnation suppression control in this modification, when the indoor unit liquid pipe temperatures are lower than 1 degree C., the stagnation suppression control is ended with the stagnation-resolving flag=1 without reducing the target evaporating temperature, and the subsequent stagnation-avoidance priority control is started.

[Modification 1 of Stagnation-Avoidance Priority Control]

In the above stagnation-avoidance priority control (including the modification), the air-sending device of a stopped indoor unit B which has been temporarily stopped may be further forced to be activated, and the indoor heat exchanger of the stopped indoor unit B may be caused to operate as an evaporator. The air-sending device of the stopped indoor unit B is activated to send light airs, and also an opening degree of the expansion valve included in the stopped indoor unit B is opened by a small amount (for example, 50 pulses).

[Modification 2 of Stagnation-Avoidance Priority Control]

Although, in FIG. 6, opening degrees of the expansion valves of the indoor units B are increased more than at present by, for example, 20 pulses, an opening degree of the subcooling expansion valve 24 of the outdoor unit A in place of the indoor units B may be controlled to be opened (for example, an 80-pulse increase). That is, it is only required that an expansion valve whose opening degree is controlled to be opened in the stagnation-avoidance priority control is an expansion valve provided between the outdoor heat exchanger 3 and the indoor heat exchangers 9, 10, and 11. In the case where the opening degree of the subcooling expansion valve 24 is controlled to be opened in this way, the target evaporating temperature is similarly reduced lower than at present by 5 degrees C. after a change in the opening degree of the subcooling expansion valve 24.

[Modification of Measurement Time Period Measured by Stagnation-Resolving Timer]

In the above description, the measurement time period measured by the stagnation-resolving timer is a predetermined fixed time period (3 minutes here). Instead of this, at the start of the stagnation suppression control or the stagnation-avoidance priority control, a time period taken to resolve refrigerant stagnation is dynamically calculated on the basis of a refrigerant circulation volume per path of the condenser 3 as follows, and a point in time when the stagnation-avoidance priority control is ended may be determined. It is noted that the measurement time period measured by the stagnation-resolving timer and the time period taken to resolve refrigerant stagnation correspond to "a duration" in the present invention.

The length of a heat-transfer tube per path÷a refrigerant flow velocity is a time period taken to resolve refrigerant stagnation. Thus, a time period taken to resolve stagnation t1 [sec] is defined by the following equation.

$$t1 = L \div (Grs \div 60 \div N \times \gamma \div A),$$

where

γ: a specific volume of refrigerant [m³/kg], and

A: a cross-sectional area of the heat-transfer tube [m²].

The invention claimed is:

1. An air-conditioning apparatus comprising:
a refrigerant circuit in which an outdoor unit including a compressor whose frequency can be varied and an outdoor heat exchanger, and a plurality of indoor units each including an indoor heat exchanger are connected with refrigerant pipes, and which performs at least a cooling operation in which the outdoor heat exchanger functions as a condenser and also the indoor heat exchanger functions as an evaporator;
an expansion valve provided between the outdoor heat exchanger and the indoor heat exchanger in the refrigerant circuit; and a controller configured to control frequency of the compressor so that an evaporating temperature reaches a target evaporating temperature during cooling operation, and, when refrigerant stagnation in the condenser of the outdoor unit is detected during cooling operation, implement a stagnation-resolving operation, wherein, the controller performs, as the stagnation-resolving operation, stagnation suppression control in which the target evaporating temperature is reduced within a range in which the evaporator does not freeze so as to increase a refrigerant circulation volume in the condenser, and, when implementation of the stagnation suppression control is not able to resolve stagnation, stagnation-avoidance priority control in which an opening degree of the expansion valve is controlled to be opened and also the target evaporating temperature is further reduced so as to further increase the refrigerant circulation volume.

2. The air-conditioning apparatus of claim 1,
wherein the controller detects the refrigerant stagnation in the condenser in accordance with a difference in pressure between before and after the condenser.

3. The air-conditioning apparatus of claim 1,
wherein the controller detects the refrigerant stagnation in the condenser in accordance with the refrigerant circulation volume in the condenser.

4. The air-conditioning apparatus of claim 1,
wherein, in the stagnation suppression control, the controller
does a repetition of an operation of reducing the target evaporating temperature for a predetermined stagnation suppression control implementation time period so as to increase the refrigerant circulation volume flowing through the condenser to more than or equal to a refrigerant circulation volume at which the refrigerant stagnation to the condenser does not occur, and, when the refrigerant stagnation is resolved during the repetition, ends the stagnation-resolving operation, and,
when the stagnation suppression control implementation time period elapsed without the refrigerant stagnation in the condenser being resolved, performs the stagnation-avoidance priority control.

5. The air-conditioning apparatus of claim 1,
wherein, in the stagnation suppression control, the controller,
when a liquid pipe temperature of the evaporator is a predetermined temperature immediately before freezing or higher, does a repetition of an operation of reducing the target evaporating temperature for a predetermined stagnation suppression control implementation time period so as to increase the refrigerant circulation volume flowing through the condenser to more than or equal to a refrigerant circulation volume at which the refrigerant stagnation to the condenser does not occur, and, when the refrigerant stagnation is resolved during the repetition, ends the stagnation-resolving operation, and,
when the liquid pipe temperature of the evaporator is lower than the temperature immediately before freezing, waits without reducing the target evaporating temperature until the stagnation suppression control implementation time period elapsed, and, when the stagnation suppression control implementation time period elapsed since the stagnation suppression control was started, performs the stagnation-avoidance priority control.

6. The air-conditioning apparatus of claim 1,
wherein, in the stagnation-avoidance priority control, the controller,
for a predetermined stagnation-avoidance priority control implementation time period, does a repetition of a combination of an operation of controlling the opening degree of the expansion valve to be opened so as to increase the refrigerant circulation volume flowing through the condenser to more than or equal to a refrigerant circulation volume at which refrigerant does not stagnate in the condenser, and an operation of reducing the target evaporating temperature in the stagnation-avoidance priority control.

7. The air-conditioning apparatus of claim 6,
wherein the stagnation-avoidance priority control implementation time period is shorter than the stagnation suppression control implementation time period.

8. The air-conditioning apparatus of claim 1,
wherein, at a time of the stagnation-avoidance priority control, the controller
forces an air-sending device of an indoor unit which was stopped among the plurality of indoor units to be activated so as to increase a refrigerant circulation volume in the refrigerant circuit.

9. The air-conditioning apparatus of claim 1,
wherein the controller,
when once the refrigerant stagnation is resolved by the stagnation-resolving operation, determines, in accordance with an outdoor air temperature, a condensing temperature, and a condenser air flow rate, an interval that elapses before the stagnation-resolving operation is then performed again.

10. The air-conditioning apparatus of claim 1,
wherein, when all of the plurality of indoor units are stopped during stagnation-resolving operation, the controller stops the compressor, and, when a saturation temperature of the outdoor heat exchanger falls below an outdoor air temperature while the compressor is stopped, the controller drives an air-sending device of the outdoor heat exchanger so as to resolve stagnation in the outdoor heat exchanger.

11. The air-conditioning apparatus of claim 1,
wherein the condenser has a structure in which a plurality of plate-shaped fins disposed vertically are spaced, and in which a plurality of heat-transfer tubes extending perpendicular to and through the plurality of plate-shaped fins are provided, and
wherein, in a determination as to whether or not the refrigerant stagnation was resolved, when a state in which a difference in pressure between before and after the condenser is larger than a difference in head between an uppermost path and a lowermost path among a plurality of paths composed of the plurality of heat-transfer tubes lasts for a predetermined duration or a duration determined in accordance with a refrigerant circulation volume per path of the condenser, the controller determines that the refrigerant stagnation was resolved.

12. The air-conditioning apparatus of claim 1,
wherein the expansion valve whose opening degree is controlled in the stagnation-avoidance priority control is an expansion valve provided in each of the plurality of indoor units.

13. The air-conditioning apparatus of claim 1, further comprising:
an accumulator provided between the compressor and the indoor heat exchanger; and a bypass branched off from between the outdoor heat exchanger and the expansion valve, and extended to a suction side of the accumulator through a subcooling expansion valve, wherein the bypass includes a subcooling heat exchanger configured to exchange heat between refrigerant between the outdoor heat exchanger and the expansion valve, and refrigerant that passed through the subcooling expansion valve in the bypass, and wherein the expansion valve whose opening degree is controlled in the stagnation-avoidance priority control is the subcooling expansion valve.

14. An operation control method for an air-conditioning apparatus including: a refrigerant circuit in which an outdoor unit including a compressor whose frequency can be varied and an outdoor heat exchanger, and a plurality of indoor units each including an indoor heat exchanger are connected with refrigerant pipes, and which performs at least the cooling operation in which the outdoor heat exchanger functions as a condenser and also the indoor heat exchanger functions as an evaporator; and an expansion valve provided between the outdoor heat exchanger and the indoor heat exchanger in the refrigerant circuit, the operation control method comprising:

controlling frequency of the compressor so that an evaporating temperature reaches a target evaporating temperature during cooling operation; and, when refrigerant stagnation in the condenser of the outdoor unit is detected during cooling operation, implementing a stagnation-resolving operation of performing stagnation suppression control in which the target evaporating temperature is reduced within a range in which the evaporator does not freeze so as to increase a refrigerant circulation volume in the condenser, and, when implementation of the stagnation suppression control is not able to resolve stagnation, stagnation-avoidance priority control in which an opening degree of the expansion valve is controlled to be opened and also the target evaporating temperature is further reduced so as to further increase the refrigerant circulation volume.

* * * * *